United States Patent [19]
Kinder

[11] 3,819,149

[45] June 25, 1974

[54] BALL VALVE

[76] Inventor: Allan R. Kinder, 942 E. Palm St., Altadena, Calif. 91001

[22] Filed: May 24, 1973

[21] Appl. No.: 363,501

[52] U.S. Cl............ 251/309, 251/315, 251/148, 251/368, 264/230, 285/381
[51] Int. Cl............................................. F16k 5/06
[58] Field of Search ........... 251/148, 309, 315, 175, 251/368; 285/381; 264/230

[56] References Cited
UNITED STATES PATENTS

| | | | |
|---|---|---|---|
| 3,227,174 | 1/1966 | Yost | 264/230 X |
| 3,271,845 | 9/1966 | Breher | 251/315 X |
| 3,314,644 | 4/1967 | Dwyer et al. | 251/309 |
| 3,327,994 | 6/1967 | Carl | 251/368 |
| 3,490,734 | 1/1970 | Freeman | 251/175 |
| 3,544,672 | 12/1970 | Goda et al. | 285/381 X |
| 3,712,584 | 1/1973 | Wise et al. | 251/315 |

Primary Examiner—William R. Cline
Attorney, Agent, or Firm—Howson and Howson; Richard D. Weber

[57] ABSTRACT

A ball type valve, joint and stop for fluid conduits and a method of making same. The stop comprises a heat shrinkable length of tubing, and a ball disposed within said tubing, the tubing being heat shrunk in sealed relation around the ball and the tubing ends being adapted for connection to a fluid conduit. The joint is similar to the stop and includes a passage in the ball aligned with the tubing to permit fluid flow therethrough. The valve includes the elements of the joint plus means passing through the tubing for rotating the ball to permit selective opening and closing of the ball passage.

11 Claims, 9 Drawing Figures

PATENTED JUN 25 1974 3,819,149

BALL VALVE

The present invention relates generally to devices for controlling fluid flow through conduits and relates more specifically to a novel ball valve, joint, and stop for fluid conduits and a method of making same.

Ball valves have been made in the past in a number of different constructions nearly all of which have required a separable housing to permit the installation of the valve ball. Furthermore, the conventional ball valve is characterized by elaborate seal means for preventing fluid flow around the rotatable ball. The seal means generally include annular resilient elements engaging the ball adjacent the conduit flow passages, and periodic inspection and replacement of the seals are normally required.

The present invention provides a novel ball-type valve which does not require a separable housing or an internal seal assembly for the valve ball. The present construction in brief comprises a length of heat shrinkable plastic tubing within which a ball is disposed having a diameter substantially equal to the inner diameter of the tubing. The tubing is heat shrunk around the ball to capture the ball in sealed yet rotatable relation therewithin. A passage is provided in the ball and means extending through the tubing are provided for rotating the ball to regulate fluid flow through the tubing. The ends of the tubing may be heat shrunk or threadedly connected to the spaced ends of a fluid conduit.

The invention also may be employed as a joint for fluid conduits, in which case the means for rotating the ball is omitted and the ball is fixed in position with the passage thereof aligned with the tubing. For use of the invention as a fluid stop, both the ball passage and the ball rotating means are omitted.

It is accordingly a primary object of the present invention to provide a novel flow control means for fluid conduits which may with minor modification be employed as a valve, joint, or stop.

Another object of the invention is to provide a novel ball valve of a simple, light-weight and inexpensive construction.

Another object of the invention is to provide a ball valve as described which does not require a separable housing or internal seal assemblies.

A still further object of the invention is to provide a novel joint for connecting opposed tubular fluid conduits.

A still further object of the invention is to provide a novel stop for preventing flow of fluids through a fluid conduit.

Additional objects and advantages of the invention will be more readily apparent from the following detailed description of embodiments thereof when taken together with the accompanying drawings wherein.

Figure 1:
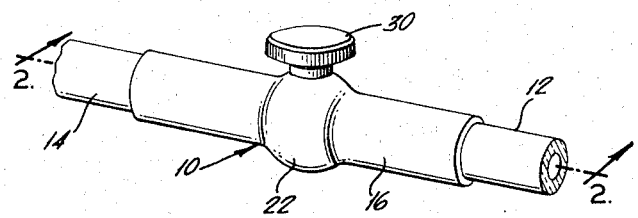
FIG. 1 is a perspective view showing a ball valve in accordance with the present invention operatively connected with a fluid conduit to control the fluid flow therethrough.
Figure 3:
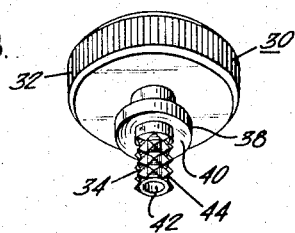
FIG. 3 is a perspective view of the valve handle shown prior to connection to the valve ball.
Figure 2:
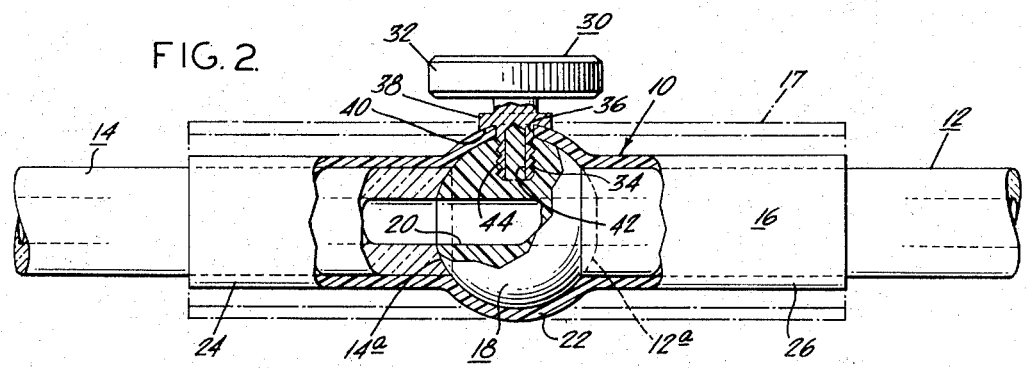
FIG. 2 is an enlarged view taken along line 2—2 of FIG. 1 with parts thereof broken away and sectioned to show the interior valve details.

Referring to the drawings and particularly FIGS. 1–3 thereof, a ball valve generally designated 10 embodying the invention is shown interposed between portions 12 and 14 of a tubular fluid conduit. As most clearly shown in FIG. 2, the ball valve 10 includes a length of heat-shrinkable plastic tubing 16 having an initial unshrunk cylindrical configuration as illustrated in broken lines at 17. A ball 18, which is preferably of a plastic material, is disposed within the unshrunk tubing and includes a passage 20 in the form of a cylindrical bore passing diametrically therethrough. The conduit portions 12 and 14, which have a diameter somewhat less than the diameter of the ball 18, are provided with concave spherical surfaces 14a and 12a at their inner ends which are radiused to match the spherical surface of the ball. The ends of the conduit portions 12 and 14 are inserted into the unshrunk tubing with the surfaces 14a and 12a engaged with the ball on opposite sides thereof.

The tubing 16 is heat shrunk around the ball 18 to capture the ball in a central position, thereby forming a spherical portion 22 of the tubing in engagement with the ball. Upon heat shrinking of the tubing, the end portions 24 and 26 of the tubing contact around and securely grip the conduit portions 12 and 14 inserted therewithin, thus holding the surfaces 14a and 12a thereof in engagement with the ball 18. Prior to the heat shrinking of the tubing, the passage 20 of the ball, which is preferably of a size equivalent to the fluid passage of the conduit portions 12 and 14, is aligned with the conduit fluid passages.

Means are provided for selectively rotating the ball 18 to move the ball passages 20 into and out of alignment with the conduit portions 12 and 14. In the embodiments of FIGS. 1–3, the ball rotating means comprises a handle 30 which includes a knob portion 32 located exteriorly of the tubing, and a stem portion 34 which extends through an aperture 36 formed in the tubing 16 after the heat shrinking thereof. An annular flange 38 on the stem portion 34 includes an annular spherical surface 40 which conforms with and engages the outer surface of the spherical portion 22 of the tubing. The inner end of the stem portion 34 includes a coaxial bore 42 and the exterior thereof is characterized by a knurled surface 44. The inner end of the stem portion extends into the ball 18 and is preferably anchored within the ball by ultrasonic welding which displaces some of the plastic ball material into the bore 44 as illustrated.

To operate the valve, the knob 30 is simply rotated manually to rotate the ball 18, thereby moving the passage 22 thereof into and out of alignment with the fluid conduit passages. With the ball passage in the position shown in FIG. 2, the valve is fully open to utilize the full flow capacity of the fluid conduit. Flow may be stopped completely by rotating the ball to move the passage 22 out of communication with the conduit fluid passage. A metering of the fluid flow may be obtained by a partial communication of the passage with the fluid conduit passage.

To obtain an effective seal between the heat shrunk tubing 16 and the ball 18, while retaining the rotatable relationship thereof, the materials of which the tubing and ball are made should be carefully selected. Fluorocarbon resins are the preferred plastic materials for both the tubing and the ball. In particular, the preferred material for the tubing is a fluorinated ethylene-propylene fluorocarbon resin known as FEP-fluorocarbon resin. A commercially available resin of this type is sold under the trademark "Teflon" FEP-fluorocarbon resin by E. I. duPont de Nemours Co., Inc., Wilmington, Delaware.

The preferred ball material is also a fluorocarbon resin, in particular a tetrafluorethylene fluorocarbon resin known as TFE-fluorocarbon resin. A commercially available resin of this type is sold as "Teflon" TFE- fluorocarbon resin by E. I. duPont de Nemours Co., Inc. While it is believed that other materials could satisfactorily be used than those specifically identified, tests have only been made with respect to these specific materials which have been found to produce excellent results. It is believed that the degree of resilience exhibited by these plastic materials provides the required sealing effect while permitting a relative movement of the seal surfaces. In pressure tests utilizing alcohol as the fluid medium, a ball valve embodying the invention has withstood pressures in excess of 45 psi without leakage.

The shape and means of attachment of the handle 30 may of course be varied to suit the particular valve application. A lever type control might for example be substituted and the means of attachment to the ball could take a variety of forms. The preferred ultrasonic welding means of attachment has, however, proven to be a simple and effective means of connecting the handle to the ball.

Figure 4:
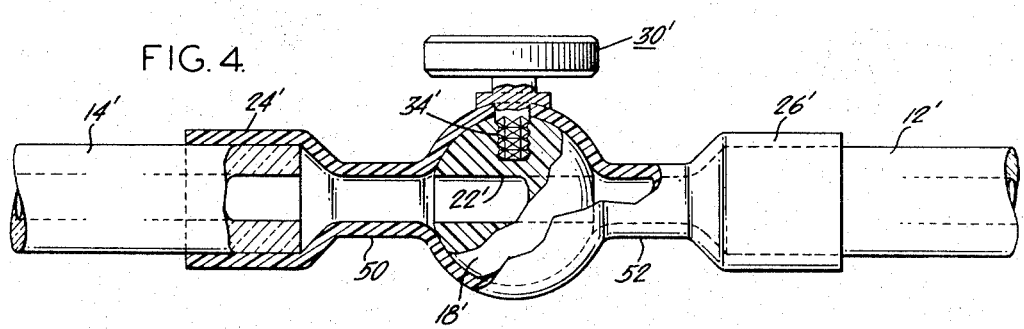
FIG. 4 is a side elevational view partly in section showing a modified form of ball valve embodying the present invention.

In FIG. 4, a modified form of the invention is illustrated which closely resembles the valve of FIGS. 1–3. Accordingly, common elements are designated with the same identifying numbers with the addition of a prime suffix. The embodiment of FIG. 4 differs only in that the ends of the conduit portions 12' and 14' are spaced from the ball 18', resulting in necked down regions 50 and 52 in the end portions 24' and 26' of the tubing. Since the conduit portions 12' and 14' do not engage the ball, their ends need not be radiused and hence the FIG. 4 embodiment is somewhat simpler to fabricate than the preferred embodiment of FIGS. 1–3. It does, however, suffer the disadvantage of a non-uniform flow passage and the formation of cavities adjacent the conduit portion ends which under some circumstances may prove undesirable. The fabrication and operation of the valve of FIG. 4 is identical with that of the previously described embodiment.

Figure 9:
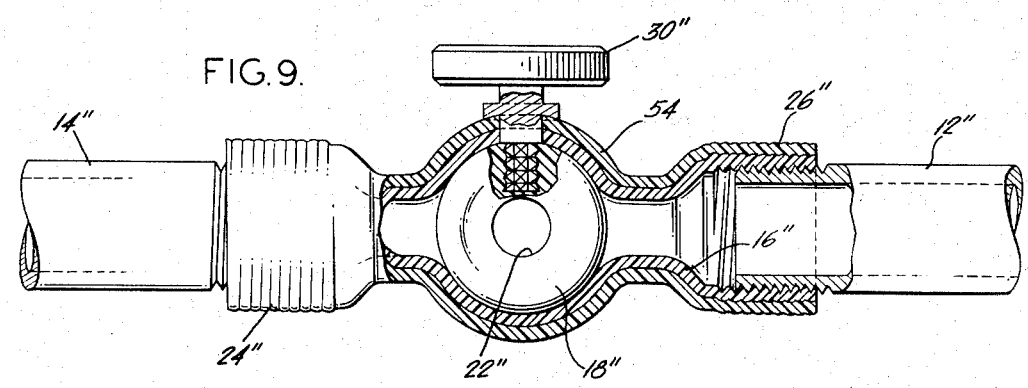
FIG. 9 is a side elevational view partly broken away and in section showing a further modified form of ball valve embodying the present invention.

The modified embodiment of FIG. 9 is also similar to that of FIGS. 1–3 and the corresponding parts are accorded corresponding numerals with a double prime. The essential differences between the embodiment of FIG. 4 and FIG. 9 are the inclusion in FIG. 9 of a second tubing length 54 overlying the tubing 16'', the second tubing length being separately heat shrunk in place following the heat shrinking of the first tubing length. The provision of a double thickness of tubing provides a stronger, more rigid structure which can be expected to withstand higher pressures.

A second difference between the embodiment of FIG. 4 and FIG. 9 is the threading of the ends of the tubing portions 24'' and 26'' to permit a threaded connection with the conduits 12'' and 14''. Although the tubing layers 16' and 54 may be sequentially molded directly in place on the threaded ends of the conduits 12'' and 14'', the threading of the tubing is preferably done over suitable threaded inserts which are subsequently removed. The threading of the valve ends thus permits the field installation of the valve which would be necessary in valves of larger sizes. The operation of the valve of FIG. 9 is identical with that of the previously described embodiments. It will be noted that the valve is shown in the closed position with the passage 22'' thereof perpendicularly disposed with respect to the conduit portions.

Figure 5:
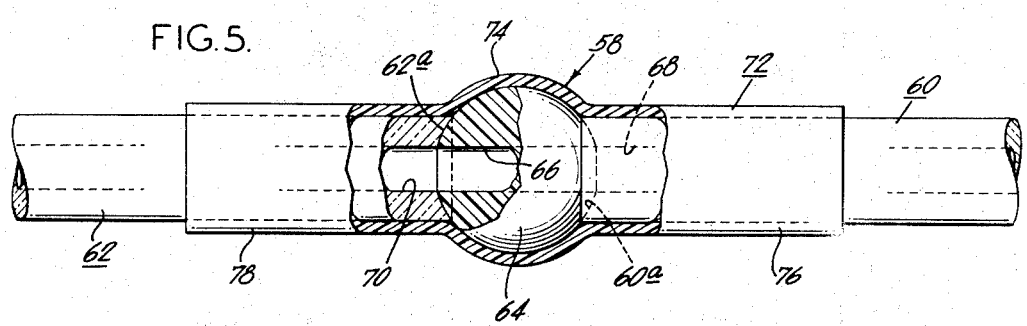
FIG. 5 is a side elevational view partly broken away and in section showing a fluid conduit joint embodying the present invention.

In FIG. 5, a modified form of the invention is shown which constitutes a joint 58 for joining tubular conduits 60 and 62 in an aligned manner and with a uniform smooth-walled fluid passage. The opposed ends 60a and 62a of the conduits 60 and 62 are provided with concave spherical surfaces of an equal radius with that of a ball 64 against which they are disposed in diametrically opposed relation. A passage 66 of the same diameter as the passages 68 and 70 of the fluid conduits 60 and 62 is provided in the ball 64 and is aligned with the passages 68 and 70. A length of heat shrinkable plastic tubing 72 is heat shrunk over the ball 64 and the ends of the conduits 60 and 62 to secure the conduits against the ball in leak-tight relation. The tubing 72 after heat shrinking includes a spherical portion 74 enveloping the ball in fluid sealed relation and end portions 76 and 78 respectively contracted in sealed relation about the conduits 60 and 62. In view of the alignment of the ball passage 66 with the conduit passages 68 and 70, there are no interruptions in the fluid flow passage and hence no cavities in which foreign matter can settle.

Figure 6:
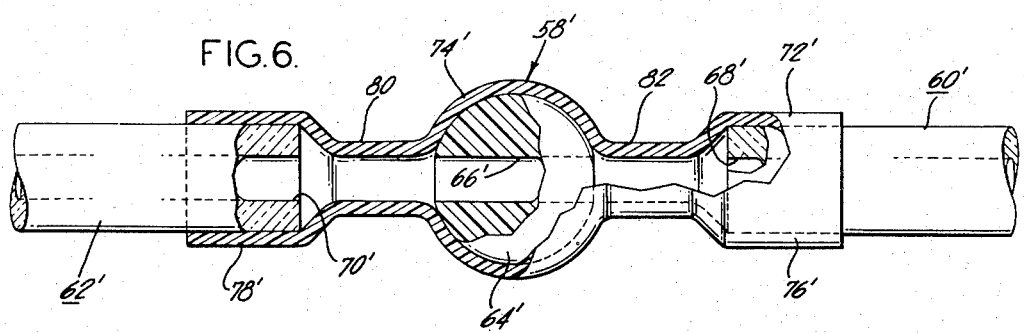
FIG. 6 is a side elevational view partly broken away and in section showing a modified form of ball joint embodying the present invention.

A modified form of the joint of FIG. 5 is shown in FIG. 6, the corresponding parts thereof being designated by the same numerals with a prime suffix. The structure of the joint of FIG. 6 differs only in the spacing of the ends of the conduits 60' and 62' from the ball 64', thus producing necked down portions 80 and 82 in the tube 72' upon the heat shrinking of the tube. Although simpler to fabricate, this joint does not have the smooth-walled flow passage characteristic of the embodiment of FIG. 5. The method of fabrication is essentially the same as that of the joint of FIG. 5, the ball being centrally disposed within a length of heat shrinkable tubing and the conduit ends being similarly disposed prior to the heat shrinking of the tubing.

Figure 7:
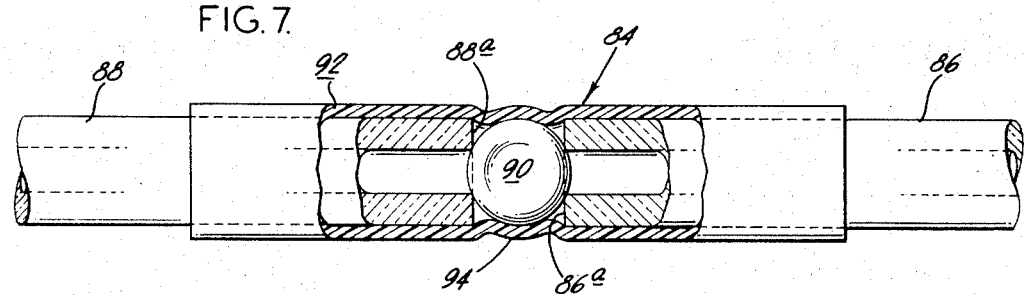
FIG. 7 is a side elevational view partly broken away and in section showing a stop for fluid conduits embodying the present invention.

In FIG. 7 a further modified form of the invention is illustrated which comprises a stop generally designated 84 for joining two fluid conduits 86 and 88 in aligned relation but preventing flow therebetween. A ball 90 is disposed between the ends 86a and 88a of the conduits and the conduit ends are secured in sealed relation against the ball by an overlying length of heat shrinkable tubing 92 which is heat shrunk in place around the ball and the end of the conduits 86 and 88. The tubing 92 conforms to the shape of the ball in a spherical portion 94 thus producing a fluid-tight seal.

Figure 8:
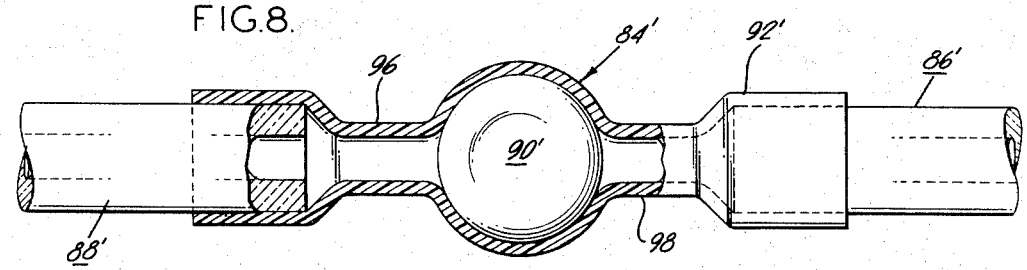
FIG. 8 is a side elevational view partly broken away and in section showing a modified form of fluid conduit stop embodying the present invention.

In FIG. 8 a further modified embodiment of the invention is illustrated in the form of a stop for fluid conduits. In view of its similarity to the stop 84 of FIG. 7, corresponding parts of the embodiment of FIG. 8 are designated with the same numerals with a prime suffix. The embodiment of FIG. 8 differs from the embodiment of FIG. 7 essentially in the spacing of the ends 86a' and 88a' of the conduits from the ball 90', thereby producing the necked down portions 96 and 98 of the tubing 92 upon heat shrinking thereof. The stop 84' functions in the same manner as the stop 84, namely to join the conduits 86' and 88' in aligned relation by preventing fluid flow therebetween. The ball 90' is proportionately larger than the ball 90 providing a larger sealing surface of engagement of the heat shrunk tubing about the ball.

It will be obvious that the selection of the ball size is a matter of choice and that the invention can be practiced with balls of virtually any practical size. Similarly, the overall size of the valves, joints, or stops utilizing the invention are virtually unlimited, ranging from small laboratory instrument sizes (i.e. one-eighth inch) to large valves of a foot or more in diameter for commercial applications.

It is expected that the invention will be particularly well adapted for laboratory use such as in burettes and the like and also for medical uses such as flow control for intraveneous feeding. Since the cost of valves of the small size required for such applications is estimated to be as low as 10 percent of the cost of presently available devices, the present units could be discarded following use and a new unit inserted in its place. The cost and time of replacement can be expected to be considerably less than the cost in terms of time required for cleaning conventional devices.

In view of its permissible fabrication entirely from plastic materials which are chemically inert, the invention is particularly suited for the handling of corrosive materials. The plastic construction provides the additional advantage of an unbreakable structure of light weight which is inexpensive to fabricate. Although best suited for control of liquid flow, it is believed that the invention could suitably be used for control of gaseous media under low pressure.

Manifestly, changes in details can be effected by those skilled in the art without departing from the spirit and the scope of the invention.

I claim:

1. A ball valve comprising a length of heat shrinkable plastic tubing, said tubing being externally unsupported, a ball disposed centrally within said tubing, a passage in said ball, the end portions of said tubing having a diameter small than that of said ball, a central spherical portion of said tubing engaging and securing said ball in heat shrunk sealing rotatable relation, and means connected to said ball and passing through said tubing for providing selective rotation of said ball.

2. The invention as claimed in claim 1, the ends of said tubing being adapted for attachment to a fluid conduit.

3. The invention as claimed in claim 1, wherein said tubing comprises a fluorocarbon resin.

4. The invention as claimed in claim 1, wherein said tubing comprises a fluorinated ethylene-propylene fluorocarbon resin.

5. The invention as claimed in claim 3, wherein said ball comprises a fluorocarbon resin.

6. The invention as claimed in claim 4, wherein said ball comprises a tetrafluoroethylene fluorocarbon resin.

7. The invention as claimed in claim 1, including an additional length of heat shrinkable tubing heat shrunk over said first recited length of tubing.

8. A ball valve assembly for controlling fluid flow through a tubular conduit having aligned end portions joined by said valve, said assembly including a length of heat shrinkable plastic tubing, said tubing being externally unsupported, a ball centrally disposed within said tubing, a passage in said ball, said conduit end portions each having a spherically radiused configuration for cooperative sealing engagement with said ball, said end portions being disposed in opposed, aligned relationship against said ball, the end portions of said tubing overlying said conduit end portions and having a smaller diameter than said ball, a central spherical portion of said tubing engaging and receiving said ball in fluid sealing rotatable relation, and means connected to said ball and passing through said tubing for providing selective rotation of said ball.

9. A method of making a ball valve comprising the steps of preparing a length of heat shrinkable plastic tubing, disposing a ball having a passage therein within said tubing, heat shrinking said plastic tubing about said ball to secure said ball in rotatable sealed relation therewithin, forming an aperture in said tubing adjacent said ball, and attaching ball rotating means to said ball through said tubing aperture by ultrasonically welding the ball rotating means to said ball.

10. The method as claimed in claim 9, including the step of introducing the ends of fluid conduits into the ends of said tubing prior to the heat shrinking thereof, and heat shrinking the tubing about said conduit ends in addition to said ball to secure said ball valve to said conduits.

11. The method as claimed in claim 9 wherein said ball rotating means comprises a handle having a hollow stem portion and wherein the ultrasonic welding displaces ball material into said hollow stem portion.

* * * * *